(12) United States Patent
Kim et al.

(10) Patent No.: US 10,331,176 B2
(45) Date of Patent: Jun. 25, 2019

(54) ELECTRONIC DEVICE WITH A FOLDABLE DISPLAY AND METHOD OF OPERATING THE SAME

(71) Applicant: Samsung Display Co., Ltd., Yongin-si (KR)

(72) Inventors: Sang-Hoon Kim, Hwaseong-si (KR); Bo-A Kim, Incheon-si (KR); Sang-Il Park, Yongin-si (KR); Heon-Jung Shin, Hwaseong-si (KR); Hyun-Joon Oh, Seongnam-si (KR); Hye-Jin Oh, Asan-si (KR); Jeoung-Sub Lee, Seoul (KR); Min-Hoon Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 24 days.

(21) Appl. No.: 15/493,082

(22) Filed: Apr. 20, 2017

(65) Prior Publication Data

US 2018/0059736 A1 Mar. 1, 2018

(30) Foreign Application Priority Data

Aug. 30, 2016 (KR) .......................... 10-2016-0110628

(51) Int. Cl.
*G06F 1/16* (2006.01)
(52) U.S. Cl.
CPC .......... *G06F 1/1681* (2013.01); *G06F 1/1616* (2013.01); *G06F 1/1641* (2013.01); *G06F 1/1652* (2013.01)
(58) Field of Classification Search
CPC .... G06F 1/1652; G06F 1/1641; G06F 1/1616; G06F 1/1681; G06F 1/1618; G06F 1/1637; G06F 3/1423; H05K 5/0017; H05K 5/0217; H05K 5/0204; H05K 7/16
See application file for complete search history.

(56) References Cited

U.S. PATENT DOCUMENTS

| | | | |
|---|---|---|---|
| 9,173,287 B1 | 10/2015 | Kim et al. | |
| 9,176,535 B2* | 11/2015 | Bohn | ..................... G06F 1/1641 |
| 2012/0044620 A1* | 2/2012 | Song | ..................... G06F 1/1616 |
| | | | 361/679.01 |
| 2012/0314400 A1* | 12/2012 | Bohn | ..................... G09F 9/301 |
| | | | 362/97.1 |
| 2015/0077917 A1 | 3/2015 | Song | |
| 2015/0131222 A1 | 5/2015 | Kauhaniemi et al. | |
| 2015/0257289 A1* | 9/2015 | Lee | ..................... H05K 5/0017 |
| | | | 361/749 |

(Continued)

*Primary Examiner* — Dimary S Lopez Cruz
*Assistant Examiner* — Ingrid D Wright
(74) *Attorney, Agent, or Firm* — H.C. Park & Associates, PLC

(57) ABSTRACT

An electronic device includes a foldable display device, a supporting member, and a housing. The foldable display device includes at least one folding area and a plurality of non-folding areas. The supporting member is disposed in the non-folding areas to support the foldable display device. The housing includes a body part that contains the foldable display device and the supporting member, and a hinge member that folds or unfolds sections of the body part, the body part supporting the supporting member for movement relative to the housing. A folding axis defined in the folding area by the location of the hinge member is changeable in response to movement of the supporting member in the housing.

18 Claims, 9 Drawing Sheets

(56) References Cited

U.S. PATENT DOCUMENTS

2016/0212840 A1\* 7/2016 Koo ................ G09F 9/301
2016/0302316 A1\* 10/2016 Jeong ............. G05B 11/01
2017/0160769 A1\* 6/2017 Xu ................ G06F 1/1641

\* cited by examiner

ELECTRONIC DEVICE WITH A FOLDABLE DISPLAY AND METHOD OF OPERATING THE SAME

CROSS-REFERENCE TO RELATED APPLICATION

This application claims priority from and the benefit of Korean Patent Application No. 10-2016-0110628, filed on Aug. 30, 2016, which is hereby incorporated by reference for all purposes as if fully set forth herein.

BACKGROUND

Field

The invention relates generally to electronic devices including foldable display devices, and more particularly, to an electronic device and a method of operating the same that reduces stress in the folding area.

Discussion of the Background

Flat panel display (FPD) devices are widely used as a display device of electronic devices because FPD devices are relatively lightweight and thin compared to cathode-ray tube (CRT) display device. Examples of FPD devices include liquid crystal display (LCD) devices, field emission display (FED) devices, plasma display panel (PDP) devices, and organic light emitting display (OLED) devices. The OLED devices have been spotlighted as next-generation display devices because the OLED devices have various advantages such as a wide viewing angle, a rapid response speed, a thin thickness, low power consumption, etc. Recently, foldable display devices, which can be folded for portability and unfolded to increase the viewing area, are being developed.

The above information disclosed in this Background section is only for enhancement of understanding of the background of the inventive concepts, and, therefore, it may contain information that does not form the prior art that is already known in this country to a person of ordinary skill in the art.

SUMMARY

Electronic devices constructed according to the principles of the invention include a foldable display device capable of decreasing or dispersing stress in a folding area.

Methods of operating an electronic device according to the principles of the invention control a foldable display device to decrease or disperse stress in a folding area.

Additional aspects will be set forth in the detailed description which follows, and, in part, will be apparent from the disclosure, or may be learned by practice of the inventive concepts.

According to one aspect of the invention, an electronic device includes a foldable display device including at least one folding area and a plurality of non-folding areas; a supporting member configured to support the foldable display device, the supporting member being disposed in the non-folding areas; and a housing including a body part that contains the foldable display device and the supporting member, and a hinge member that folds or unfolds sections of the body part, the body part supporting the supporting member for movement relative to the housing. A folding axis defined in the folding area by the location of the hinge member is changeable in response to movement of the supporting member in the housing.

The body part may support the supporting member for movement in a first substantially parallel with an internal surface of the body part.

The body part may support the supporting member for movement in a second direction generally opposite to the first direction.

The housing may include a space to which the supporting member is moved in a first direction or a second direction opposite to the first direction.

The supporting member may move in at least one or more predetermined distances.

The supporting member may move in variable distances.

The foldable display device may be folded inwardly about the folding axis such that portions of a display surface of the foldable display device inwardly face towards each other.

The foldable display device may be folded outwardly about the folding axis such that portions of a display surface of the foldable display device face outwardly away from each other towards the outside of the electronic device.

The electronic device may further include a transportation member configured to move the supporting member.

The electronic device may further include a controller configured to control the transportation member.

According to another aspect of the invention, a method of operating an electronic device having a housing foldable about a hinge member and a foldable display device contained in the housing including the steps of: defining a first folding axis in a folding area of the foldable display device by moving the foldable display device to a first position in the folding area overlapping the hinge member; folding the electronic device about the first folding axis; unfolding the electronic device; and moving the foldable display device to a second position in the folding area overlapping the hinge member such that a second folding axis different from the first folding axis is defined in the folding area.

The step of unfolding the electronic device may include unfolding the electronic device about the first folding axis.

The method may further include the step of folding the electronic device about the second folding axis.

The step of moving the foldable display device may include moving in at least one predetermined increment.

The step of moving the foldable display device may include moving in variable increments.

The method may further include the step of moving the foldable display device to a third position in the folding area overlapping the hinge member such that a third folding axis is defined in the folding area different from the first and second folding axes.

The step of folding the electronic device about the first folding axis may include folding the foldable display device inwardly about the second folding axis such that portions of a display surface of the foldable display device face inwardly towards each other.

The step of folding the electronic device about the second folding axis may include folding the foldable display device about the second folding axis such that portions of a display surface of the foldable display device face outwardly away from each other towards the outside of the electronic device.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
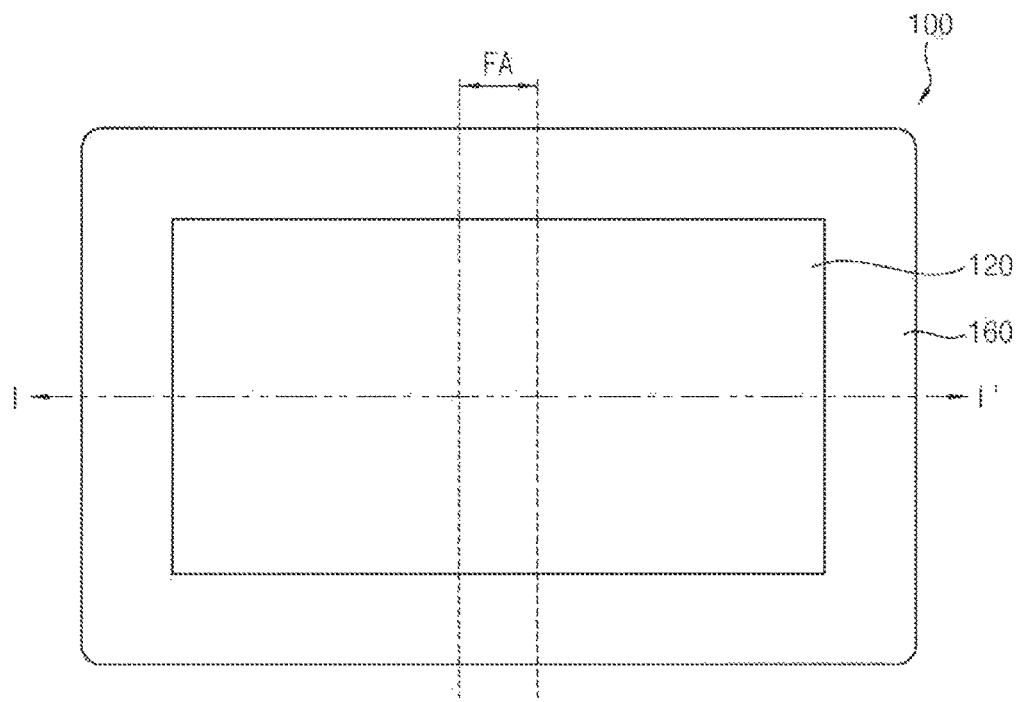
FIG. 1 is a plan view of an electronic device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
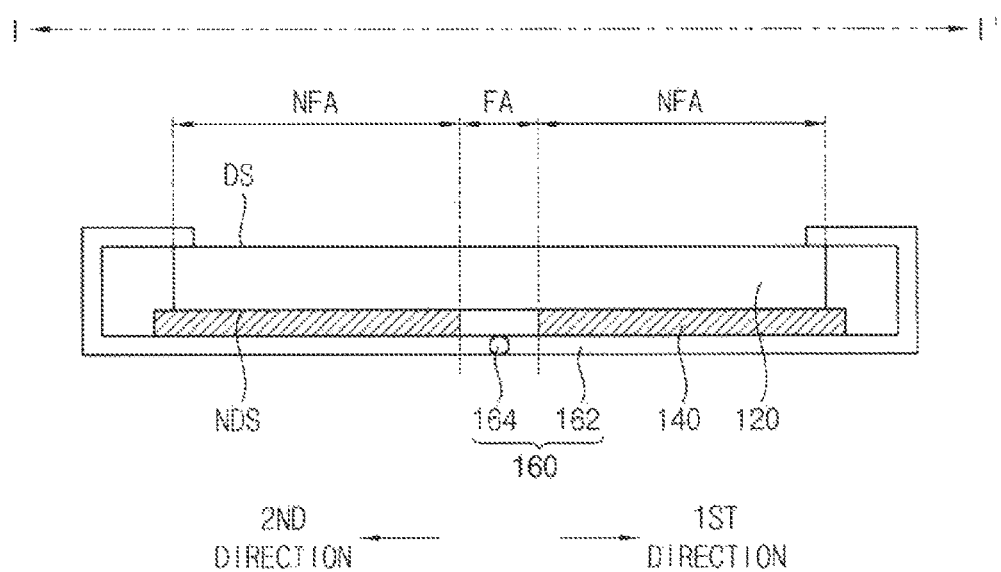
FIG. 2 is a cross-sectional view of the electronic device taken along line I-I' of FIG. 1.

FIG. 1 is a plan view of an electronic device constructed according to the principles of the invention and FIG. 2 is a cross-sectional view of the electronic device taken along line I-I' of FIG. 1.

Figure 13:
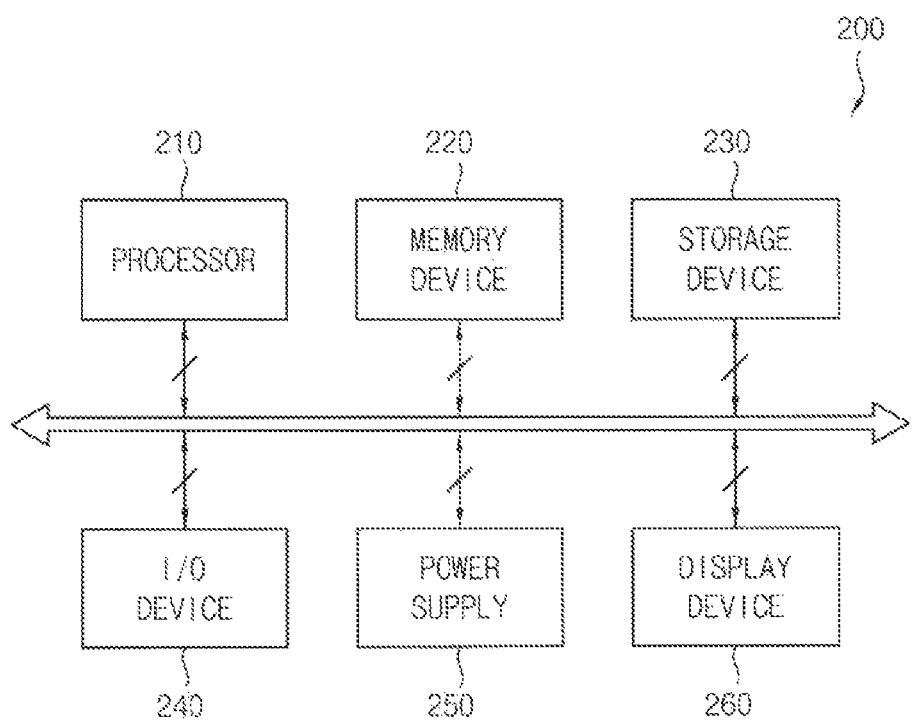
FIG. 13 is a block diagram illustrating the electronic device of FIG. 1.

Referring to FIGS. 1 and 2, an electronic device 100 may include a foldable display device 120, a supporting member 140 to support the display device 120, and a housing 160 containing the display device 120, the supporting member 160 and other components of the electronic device, such as those shown in FIG. 13.

The foldable display device 120 may include at least one folding area FA and a plurality of unfolding areas NFA. The folding area FA may be disposed between the unfolding areas NFA. Further, the foldable display device 120 may include a display surface DS at least part of which is exposed by the housing 160 and a non-display surface NDS adjacent the supporting member 140. The foldable display device 120 may display an image on the display surface DS of the folding area FA and the non-folding area NFA.

The foldable display device 120 may be folded or unfolded about a folding axis formed in the folding area FA. In one or more exemplary embodiments, the foldable display device 120 may be inwardly folded about the folding axis such that portions of the display surface DS face inwardly toward each other. In one or more exemplary embodiments, the foldable display device 120 may be outwardly folded about the folding axis such that the portions of the display surface DS face outwardly towards the outside of the electronic device 100.

The foldable display device 120 may include one folding area FA as shown in FIG. 1, however, exemplary embodiments are not limited thereto. Thus, the foldable display device 120 may also include a plurality of folding areas FA. In this example, a folding axis may be formed in each of the plurality of folding areas FA.

The foldable display device 120 may include a display panel, a window, a protection film, a mechanical member (described subsequently) and other components known in the art. The display panel may display the image. The display panel may be implemented as an organic light emitting display panel, a liquid crystal display panel, a plasma display panel, field emission display panel, or other types of panels known in the art. For example, in case where the display panel is implemented as the organic light emitting display panel, the display panel may include a substrate, electrodes and an emission layer disposed on the substrate, and an encapsulation member covering the electrodes and the emission layer. The window, the protection film, and other components. may be attached on the display surface DS of the display panel, and may protect the display panel. Further, the mechanical member of the foldable display device 120 may be flexible to provide the display panel with a flexible property permitting folding, as is known in the art.

The supporting member 140 may be arranged in the non-folding area NFA. The supporting member 140 may support the foldable display device 120. The supporting member 140 may support the non-folding area NFA to prevent the non-folding area NFA from being bent or folded by an external force.

In one or more exemplary embodiments, the supporting member 140 may be supported for movement, including reciprocal movement, in the housing by any means known in the art, such as a lost motion connection. Thus, supporting member 140 may move in a first direction 1ST DIRECTION and/or a second direction 2ND DIRECTION opposite to the first direction 1ST DIRECTION. The supporting member 140 may be fixedly attached to and move the foldable display device 120 as it moves. In this manner, the folding axis formed in the folding area FA may be changed as the foldable display device 120 is moved by the supporting member 140. In one or more exemplary embodiments, the supporting member 140 may move in one of more fixed, regular distances. In one or more exemplary embodiments, the supporting member 140 may move variable, irregular distances.

The housing 160 may include a body part 162 and a hinge member 164. The body part 162 may surround the foldable display device 120 and the supporting member 140. The hinge member 164 permits folding or unfolding of the body part 162 by rotation about the hinge member. The housing 160 may define an inner space in which the foldable display device 120 and the supporting member 140 are disposed. Although FIG. 2 only illustrates that the foldable display device 120 and the supporting member 140 are disposed in the housing, a processor, a memory device, a storage device, an input/output device, a power supply, etc. (See FIG. 13) also may be further disposed in the inner space. The body part 162 of the housing 160 may be folded about the hinge member 160. In one or more exemplary embodiments, the housing 160 may be inwardly folded about the hinge member 164 such that portions of the display surface DA of the foldable display device 120 face inwardly toward each other. In one or more exemplary embodiments, the housing 160 may be outwardly folded about the hinge member 164 such that the portions of the display surface DA of the foldable display device 120 face outwardly toward the outside of the electronic device 100. The housing 120 may include a space that allows the supporting member 140 to move in the first direction 1ST DIRECTION and/or the second direction 2ND opposite to the first direction 1ST DIRECTION. The first direction 1ST DIRECTION and the second direction 2ND DIRECTION may be substantially parallel with an internal surface of the body part 162, the internal surface facing the supporting member 140.

The electronic device 100 may further include a transportation member and a controller that controls operation of the transportation member. The transportation member may move the supporting member 140 along the $1^{ST}$ and $2^{ND}$ DIRECTIONS. For example, the transportation member may be implemented with a saw-toothed shape structure, such as a rack and pinion type structure, that cooperates with the housing 160 to move the supporting member 140 and may be controlled based on a control signal provided from the controller. Here, the supporting member 140 may move at regular, predetermined distance(s). For another example, the transportation member may be implemented as an electronic device and may move the supporting member 140 based on the control signal provided from the controller. Here, the supporting member 140 may move at regular distance(s) or at variable, irregular distance.

The folding axis of the foldable display device 120 may be formed in the folding area FA according to the location of the hinge member 164 of the housing 160 about which folding occurs. The hinge member 164 overlaps the folding area FA. The folding area FA may be folded about the portion of the folding area FA overlapping the hinge member 164 when the hinge member 164 folds the body part 162 of the housing 160. The portion of the folding area FA overlapping the hinge member 164 may define the location of the folding axis.

The folding axis formed in the folding area FA may be changed as the supporting member 140 is moved in the housing 160. The supporting member 140 is disposed on and fixed to the non-folding area NFA. The foldable display device 120 may be moved in response to the movement of the supporting member 140. The portion of the folding area FA overlapping the hinge member 164 may be changed when the foldable display device 120 is moved, thereby changing the location of the folding axis.

In one or more exemplary embodiments, the folding axis formed in the folding area FA of the foldable display device 120 may be changed when the electronic device 100 is folded or unfolded.

According to the exemplary embodiments, the supporting member 140 moves to change the folding axis of the folding area FA such that the folding area FA may be folded and/or unfolded about different folding axes such that the same area of the folding area is not repetitively folded. The stress that acts on the folding area FA during repetitive folding may be dispersed, thereby reducing stress concentration on any given area.

Figure 3:
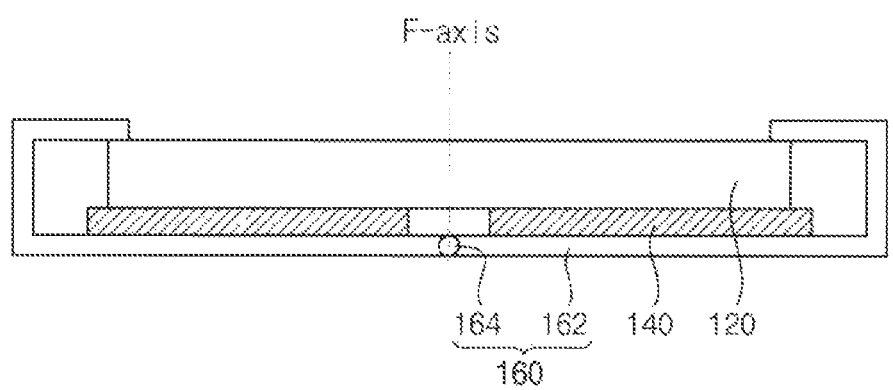
FIGS. 3 through 5 are cross-sectional views for describing an exemplary operation of the electronic device of FIG. 1 in which the location of the folding axis is changed.
Figure 4:
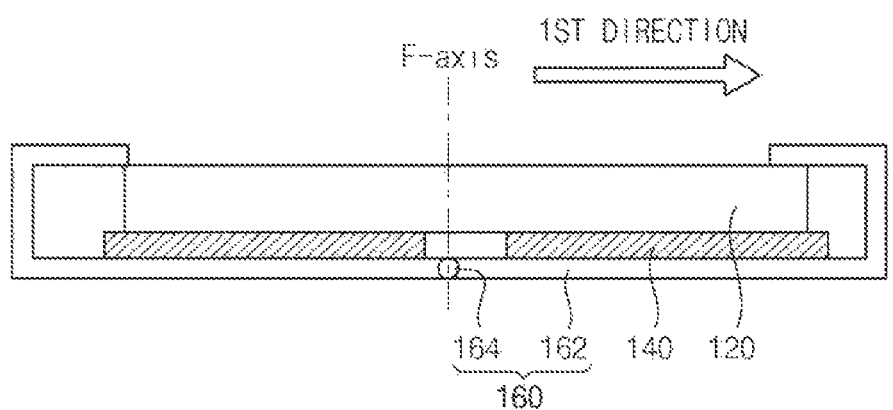
Figure 5:
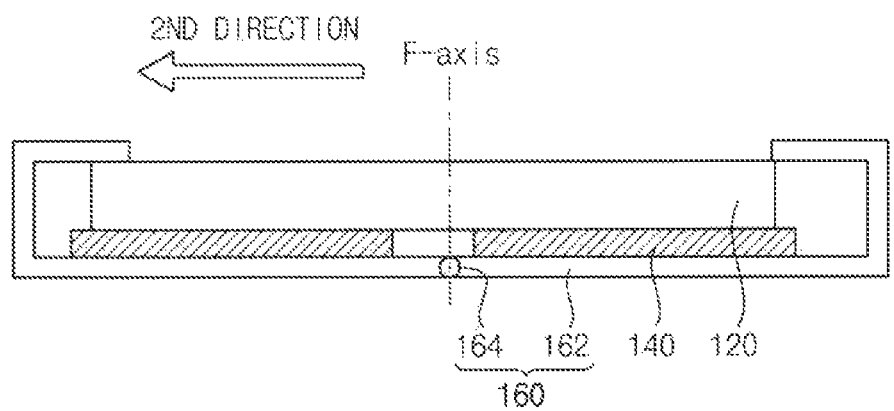

FIGS. 3 through 5 are cross-sectional views for describing an exemplary operation of the electronic device of FIG. 1 in which the location of the folding axis is changed.

Referring to FIG. 3, a folding axis F-axis may be formed in an area corresponding to the location of the hinge member 164. The foldable display device may be inwardly or outwardly folded about the folding axis F-axis.

Referring to FIG. 4, the supporting member 140 may move in the first direction 1ST DIRECTION. In one or more exemplary embodiments, the supporting member 140 may move at regular distance(s). In one or more exemplary embodiments, the supporting member 140 may move at variable, irregular distances. Here, the supporting member 140 may be coupled to the transportation member. The transportation member may move the supporting member 140 in the first direction 1ST DIRECTION based on the control signal provided form the controller. For example, the transportation member may be implemented with a saw-toothed shape structure, such as a rack and pinion type structure, that cooperates with the housing 160 or be implemented as an electronic device to transport the supporting member 140. The foldable display device 120 may be moved in the first direction 1ST DIRECTION as the supporting member 140 is moved because the supporting member 140 is fixed to the foldable display device 120. The portion of the folding area FA corresponding to the hinge member 164 of the housing 160 (that is, the folding axis F-axis) may be changed as the foldable display device 120 is moved in first direction 1ST DIRECTION.

Referring to FIG. 5, the supporting member 140 may move in the second direction 2ND DIRECTION opposite to the first direction 1ST DIRECTION. In one or more exemplary embodiments, the supporting member 140 may move at regular, fixed distances. In one or more exemplary embodiments, the supporting member 140 may move at irregular, variable distances. Here, the supporting member 140 may be coupled to the transportation member. The transportation member may move the supporting member 140 in second direction 2ND DIRECTION based on the control signal provided form the controller. For example, as noted above, the transportation member may be implemented with a saw-toothed shape structure, such as a rack and pinion type structure, that cooperates with the housing 160 or be implemented as an electronic device to transport the supporting member 140. The foldable display device 120 may be moved in the second direction 2ND DIRECTION as the supporting member 140 is moved because the supporting member 140 is fixed to the foldable display device 120. The portion of the folding area FA corresponding to the hinge member 164 of the housing 160 (that is, the folding axis F-axis) may be changed as the foldable display device 120 is moved in second direction 2ND DIRECTION.

According to the exemplary embodiments, the folding axis F-axis formed in the folding area FA may be changed by moving the foldable display device 120 in the 1ST DIRECTION or the 2ND DIRECTION in the housing 160. Thus, the stress acting upon the folding area FA may decrease.

Figure 6:
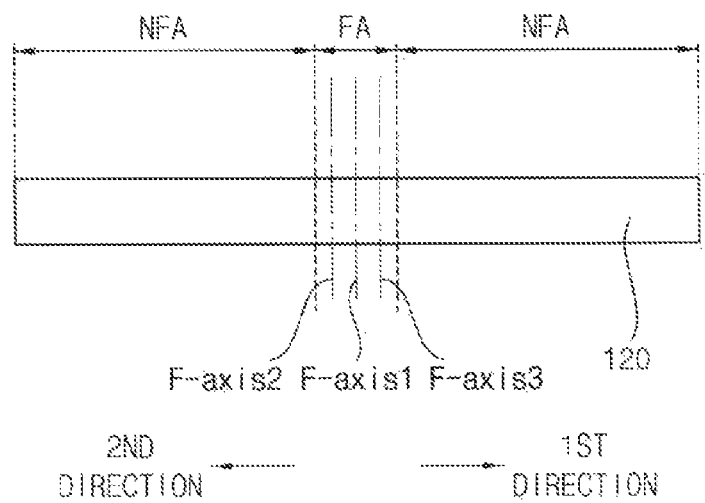
FIG. 6 is a simplified, cross-sectional view of the display device of FIG. 1 illustrating various exemplary folding axes in a folding area.

FIG. 6 is a simplified cross-sectional view of the display device of FIG. 1 illustrating various exemplary folding axes in a folding area.

Referring to FIG. 6, a plurality of folding axes F-axis1, F-axis2, and F-axis 3 may be formed in the folding area FA. The folding axes F-axis1, F-axis2, and F-axis 3 may be formed at portions of the folding area FA corresponding to the location of the hinge member 164. For example, the first folding axis F-axis1 may be formed at a center of the folding area FA of the foldable display device 120, the second folding axis F-axis2 may be formed at a left side (that is, the second direction 2ND DIRECTION) of the first folding axis F-axis1, and the third folding axis F-axis3 may be formed at a right side (that is, the first direction 1ST DIRECTION) of the first folding axis F-axis1. More than three folding axes F-axis1, F-axis2, and F-axis3 may be formed at portions of the folding area FA corresponding to location of the hinge member 164 although FIG. 6 illustrates three folding axes F-axis1, F-axis2, and F-axis3 being formed.

Figure 7:
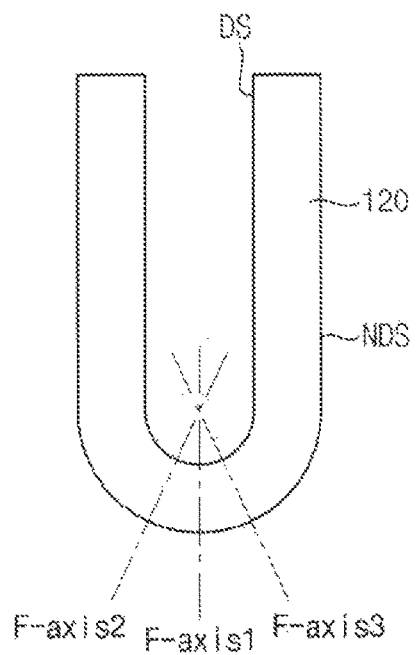
FIGS. 7 through 9 are simplified diagrams illustrating example embodiments of configurations in which the display device of FIG. 6 may be folded.
Figure 8:
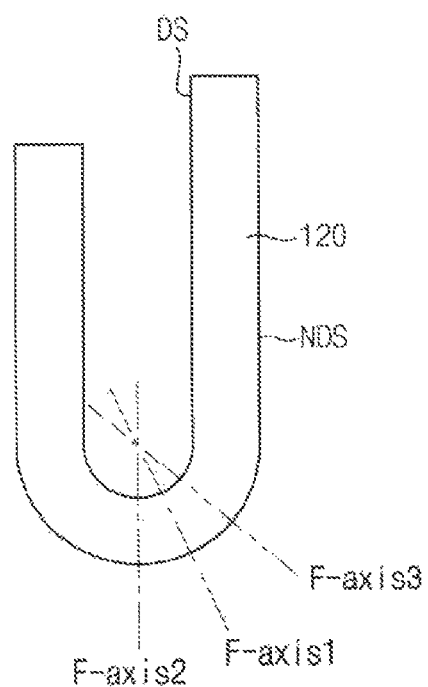
Figure 9:
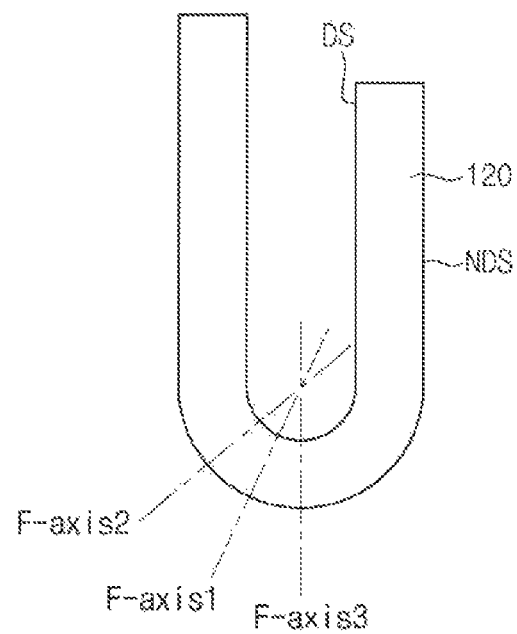

FIGS. 7 through 9 are simplified diagrams illustrating example embodiments of configurations in which the display device of FIG. 6 may be folded. FIGS. 7 through 9 illustrate configurations in which the foldable display device 120 is inwardly folded about a folding axis such that portions of the display surface DS of the foldable display device 120 face inwardly toward each other.

Referring to FIG. 7, the foldable display device 120 may be folded about the first folding axis F-axis1 formed at the center of the folding area FA. In this case, the foldable display device 120 may be symmetrically folded about the first folding axis F-axis1.

Referring to FIG. 8, the foldable display device 120 may be folded about the second folding axis F-axis2 formed at the left side of the first folding axis F-axis1. In the case in which the foldable display device 120 is moved in the 1ST DIRECTION by the supporting member 140, the second folding axis F-axis2 may be formed. The foldable display device 120 may be asymmetrically folded about the second folding axis F-axis2.

Referring to FIG. 9, the foldable display device 120 may be folded about the third folding axis F-axis3 formed at the right side of the first folding axis F-axis1. In the case in which the foldable display device 120 is moved in the 2ND DIRECTION by the supporting member 140, the third folding axis F-axis3 may be formed. The foldable display device 120 may be asymmetrically folded about the third folding axis F-axis3.

Figure 10:
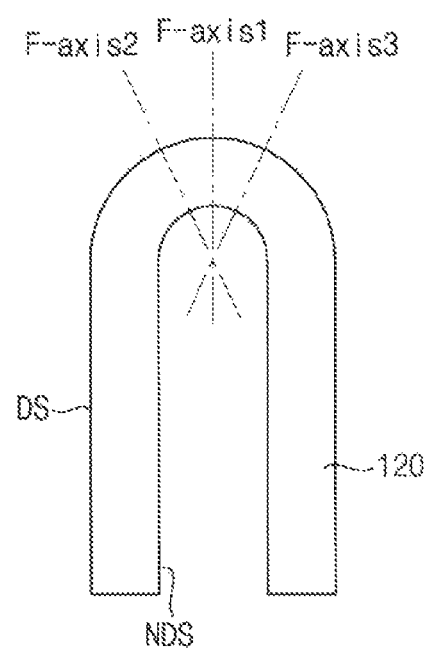
FIGS. 10 through 12 are simplified diagrams illustrating other example embodiments of configurations in which the display device of FIG. 6 may be folded.
Figure 11:
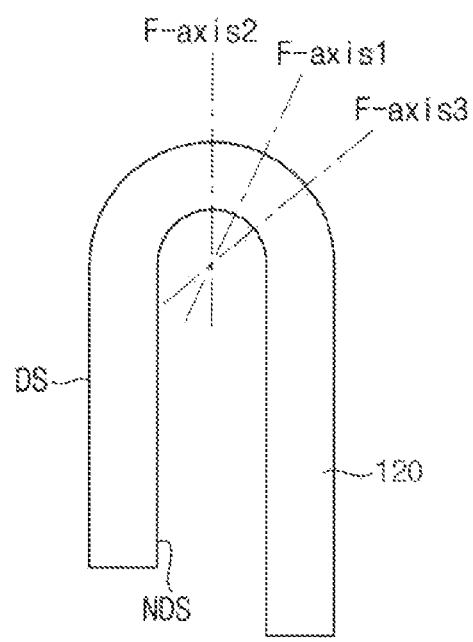
Figure 12:
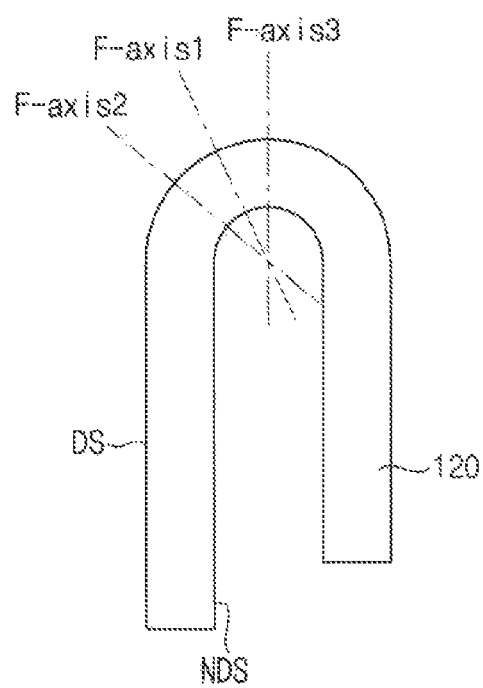

FIGS. 10 through 12 are simplified diagrams illustrating other example embodiments of configurations in which the display device of FIG. 6 may be folded. FIGS. 10 through 12 illustrate configurations in which the foldable display device 120 is outwardly folded about a folding axis such that portions of the display surface DS of the foldable display device 120 face outwardly away from each other towards the outside of the electronic device.

Referring to FIG. 10, the foldable display device 120 may be folded about the first folding axis F-axis1 formed at the center of the folding area FA. In this case, the foldable display device 120 may be symmetrically folded about the first folding axis F-axis1.

Referring to FIG. 11, the foldable display device 120 may be folded about the second folding axis F-axis2 formed at the left side of the first folding axis F-axis1. In the case in which the foldable display device 120 is moved in the 1ST DIRECTION by the supporting member 140, the second folding axis F-axis2 may be formed. The foldable display 120 may be asymmetrically folded about the second folding axis F-axis2.

Referring to FIG. 12, the foldable display device 120 may be folded about the third folding axis F-axis3 formed at the right side of the first folding axis F-axis1. In the case in which the foldable display device 120 is moved in the 2ND DIRECTION by the supporting member 140, the third folding axis F-axis3 may be formed. The foldable display 120 may be asymmetrically folded about the third folding axis F-axis3.

Figure 14:
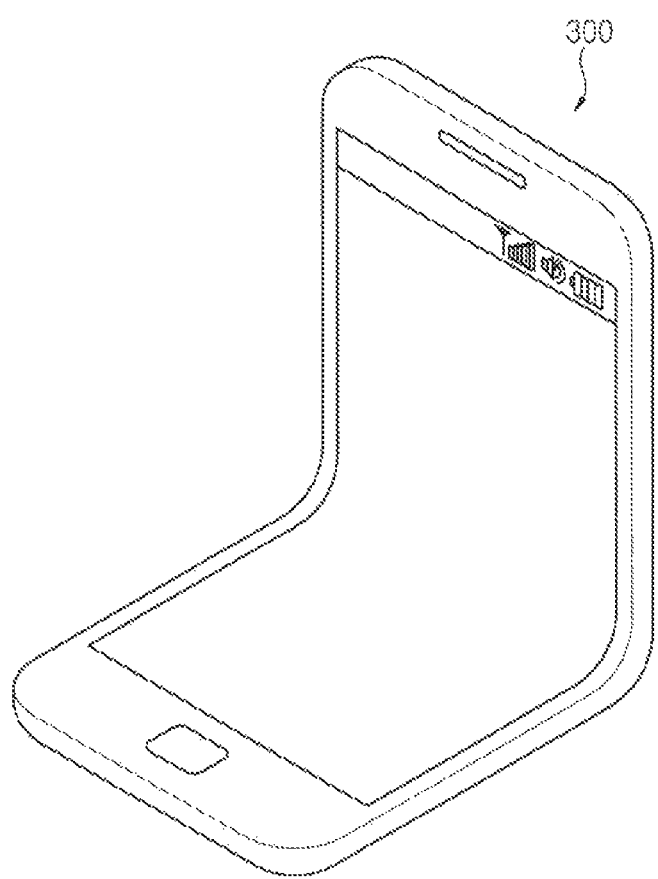
FIG. 14 is a perspective view illustrating an exemplary embodiment in which the electronic device of FIG. 13 is implemented as a smart phone.

FIG. 13 is a block diagram illustrating the electronic device of FIG. 1 and FIG. 14 is a perspective view illustrating an exemplary embodiment in which the electronic device of FIG. 13 is implemented as a smart phone.

Referring to FIGS. 13 and 14, an electronic device 200 may include a processor 210, a memory device 220, a storage device 230, an input/output (I/O) device 240, a power supply 250, and a display device 260. Here, the electronic device 200 may correspond to the electronic device 100 of FIG. 1 and the display device 260 may correspond to the foldable display device 120 of FIG. 1. In one or more exemplary embodiments, the electronic device 200 may further include a plurality of ports for connecting a video card, a sound card, a memory card, a universal serial bus (USB) device, and other electronic devices as is known in the art. Although FIG. 14 illustrates that the electronic device 200 is implemented as a smart phone 300, exemplary embodiments of the electronic device 200 are not limited thereto.

The processor 210 may perform various computing functions. The processor 210 may be a microprocessor, a central processing unit (CPU), or other processing components known in the art. The processor 210 may be coupled to other components via an address bus, a control bus, a data bus, or other components known in the art. Further, the processor 210 may be coupled to an extended bus such as surrounded component interconnect (PCI) bus. The memory device 220 may store data for operations of the electronic device 200. For example, the memory device 220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, or other such components known in the art. The storage device 230 may include a solid stage drive (SSD) device, a hard disk drive (HDD) device, a CD-ROM device, or other such components known in the art.

The I/O device 240 may be an input device such as a keyboard, a keypad, a touchpad, a touch-screen, a mouse, etc, and an output device such as a printer, a speaker, or other such components known in the art. In one or more exemplary embodiments, the display device 260 may be included in the I/O device 240. The power supply 250 may provide a power for operations of the electronic device 200. The display device 260 may communicate with other components via the buses or other communication links.

The electronic device 200 may be implemented as any suitable computing device such as a computer monitor, a laptop, a digital camera, a cellular phone, a smart phone, a smart pad, a television, a personal digital assistant (PDA), a portable multimedia player (PMP), a MP3 player, a navigation system, a game console, a video phone, or other such devices known in the art.

As described above, the electronic device 200 may include a supporting member to support the display device 260, and a housing containing the supporting member and the display device 260. The display device 260 may correspond to the foldable display device. The foldable display device may include at least one folding area and a plurality of non-folding areas. The foldable display device may display an image on a display surface of the folding area and the non-folding area. The foldable display device may be folded or unfolded about a folding axis. In one or more exemplary embodiments, the foldable display device may be folded about the folding axis such that portions of the display surface face each other. In one or more exemplary embodiments, the foldable display device may be folded about the folding axis such that the portions of the display surface face outside. The supporting member may be disposed on the non-folding areas. The supporting member may support the foldable display device. In one or more exemplary embodiments, the supporting member may move in a first direction. In one or more exemplary embodiments, the supporting member may move in a second direction opposite to the first direction. The folding axis formed in the folding area may be changed as the foldable display device moved by the supporting member. In one or more exemplary embodiments, the supporting member may move at fixed, regular distances. In one or more exemplary embodiments, the supporting member may move at variable, irregular distances. The housing may include a body part that surrounds the foldable display device and the supporting member, and a hinge member that allows the body part to be folded. In one or more exemplary embodiments, the housing may be inwardly folded about the hinge member such that the portions of the display surface of the foldable display device inwardly face each other. In one or more exemplary embodiments, the housing may be folded about the hinge member such that the portions of the display surfaces of the foldable display device face outwardly away from each other towards the outside of the electronic device. The electronic device 200 may further include a transportation member and a controller. The transportation member may move the supporting member. The controller may control an operation of the transportation member. The folding axis of the foldable display device may be formed at a portion of the folding area corresponding to a location of the hinge member of the housing. The folding axis may be changed as the supporting member is moved in the housing. Therefore, a stress upon the folding area of the foldable display device may decrease and/or be dispersed.

Figure 15:
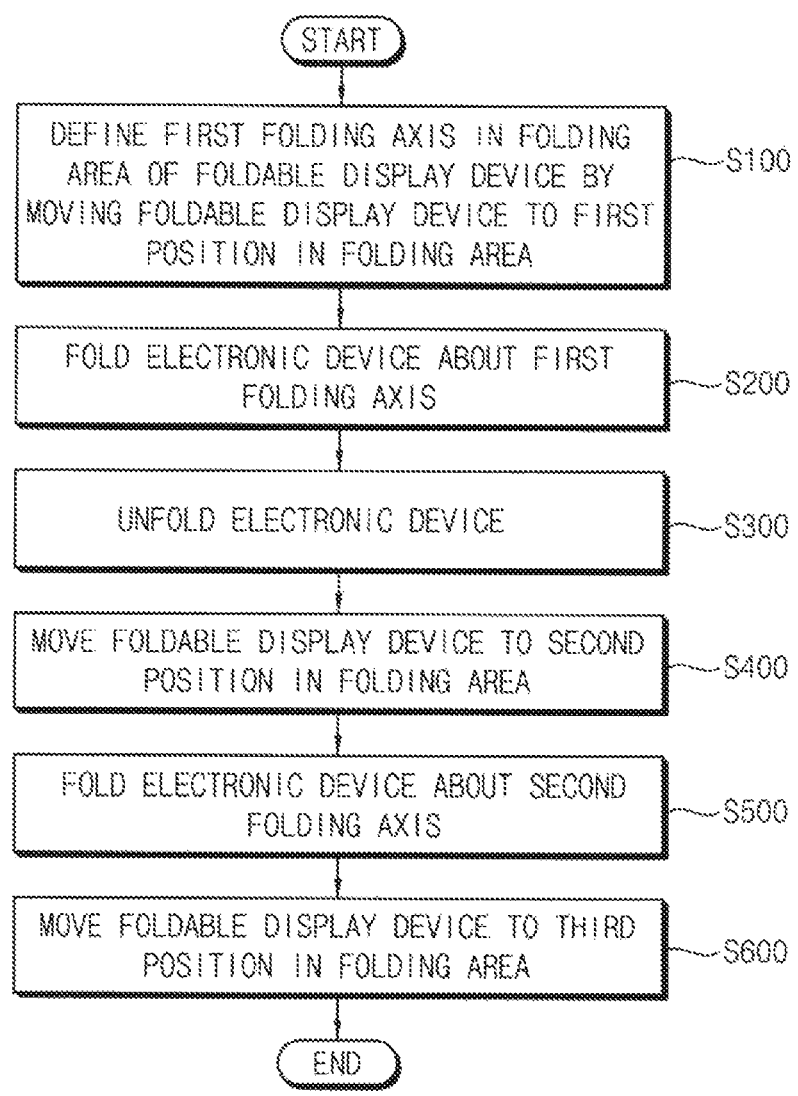
FIG. 15 is a flowchart illustrating an exemplary method of operating an electronic device according to the principles of the invention.

FIG. 15 is a flowchart illustrating an exemplary method of operating an electronic device according to the principles of the invention.

Referring to FIG. 15, an exemplary method of operating the electronic device may include a step of defining a first folding axis in a folding area of a foldable display device by moving the foldable display device to a first position in the folding area overlapping a hinge member (S100), a step of folding the electronic device about the first folding axis (S200), a step of unfolding the electronic device (S300), a step of moving the foldable display device to a second position in the folding area overlapping the hinge member such that a second folding axis is defined in the folding area, after the folding area is folded or unfolded about the first folding axis by the housing (S400), and a step of folding the electronic device about the second folding axis (S500).

The foldable display device may include at least one folding area and a plurality of non-folding areas. In one or more exemplary embodiments, the foldable display device may be inwardly folded about a folding axis such that portions of the display surface of the foldable display device inwardly face each other. In one or more exemplary embodiments, the foldable display device may be outwardly folded about the folding axis such that the portions of the display surface of the foldable display device face outwardly away from each other towards the outside. The supporting member may be disposed on the non-folding areas and may support the non-folding areas of the foldable display device. In one or more exemplary embodiments, the supporting member may move in a first direction. In one or more exemplary embodiments, the supporting member may move in a second direction opposite to the first direction. The body part of the housing may surround the foldable display device and the supporting member. The hinge member of the housing may allow the body part to be folded. The body part of the housing may be folded about hinge member. In one or more exemplary embodiments, the housing may be inwardly folded about the hinge member such that the portions of the display surface of the foldable display device face inwardly toward each other. In one or more exemplary embodiments, the housing may be folded about the hinge member such that the portions of the display surface of the foldable display device face outwardly away from each other towards the outside of the device.

According to the exemplary method, the step of defining the first folding axis in the folding area of the foldable display device by moving the foldable display device to the first position in the folding area overlapping the hinge member is performed (S100). The first folding axis may be formed at a portion of the folding area overlapping the hinge member included in the housing.

The step of folding the electronic device about the first folding axis and the step of unfolding the electronic device are performed (S200 and S300). The foldable display device may be folded and/or unfolded about the first folding axis when the housing is folded and/or unfolded by the user.

The step of moving the foldable display device to a second position in the folding area overlapping the hinge member is performed (S400). The supporting member may be coupled to a transportation member. The transportation member may move the supporting member, as described above, when the electronic device is folded or unfolded. The supporting member may move the foldable display device. In one or more exemplary embodiments, the supporting member may move at regular, fixed distances. In one or more exemplary embodiments, the supporting member may move at irregular, variable distances. The portion of the folding area overlapping the hinge member may be changed as the supporting member is moved. At the new location portion of the folding area overlapping the hinge member, the second folding axis may be formed.

The step of folding the electronic device about the second folding axis is performed (S500). The folding area may be folded or unfolded about the second folding axis when the housing is folded or unfolded by the user.

The method of operating the electronic device may further include a step of moving the foldable display device to a third position in the folding area overlapping the hinge member such that a third folding axis is defined in the folding area after the folding area is folded or unfolded about the second folding axis by the housing (S600).

According to the principles of the invention, exemplary methods of operation of the electronic device may change the folding axis of the foldable display device in repetitive folding or unfolding steps. Thus, stresses acting upon the folding area FA repetitive folding process may disperse, thereby reducing stress concentration.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An electronic device comprising:
   a foldable display device including at least one folding area and a plurality of non-folding areas;
   a supporting member configured to support the foldable display device, the supporting member including a first portion disposed in one of the non-folding areas and a second portion disposed in another one of the non-folding areas; and
   a housing including a body part that contains the foldable display device and the supporting member, and a hinge member that folds or unfolds sections of the body part, the body part supporting the first and second portions of the supporting member for movement relative to the housing in the same direction,
   wherein a folding axis defined in the folding area by the location of the hinge member is changeable in response to movement of the first portion and the second portion in the same direction.

2. The electronic device of claim 1, wherein the body part supports the first and second portions of the supporting member for movement in a first direction substantially parallel with an internal surface of the body part.

3. The electronic device of claim 2, wherein the body part supports the first and second portions of the supporting member for movement in a second direction generally opposite to the first direction.

4. The electronic device of claim 1, wherein the housing includes a space to which the supporting member is moved in a first direction or a second direction opposite to the first direction.

5. The electronic device of claim 1, wherein the supporting member moves in at least one or more predetermined distances.

6. The electronic device of claim 1, wherein the supporting member moves in variable distances.

7. The electronic device of claim 1, wherein the foldable display device is folded inwardly about the folding axis such that portions of a display surface of the foldable display device inwardly face towards each other.

8. The electronic device of claim 1, wherein the foldable display device is folded outwardly about the folding axis such that portions of a display surface of the foldable display device face outwardly away from each other towards the outside of the electronic device.

9. A method of operating an electronic device having a housing foldable about a hinge member and a foldable display device contained in the housing, the method comprising:
- defining a first folding axis in a folding area of the foldable display device by moving the foldable display device to a first position in the folding area overlapping the hinge member;
- folding the electronic device about the first folding axis;
- unfolding the electronic device; and
- moving a plurality of non-folding areas of the foldable display device in the same direction to a second position in the folding area overlapping the hinge member such that a second folding axis different from the first folding axis is defined in the folding area.

10. The method of claim 9, wherein the unfolding the electronic device comprises unfolding the electronic device about the first folding axis.

11. The method of claim 9, further comprising folding the electronic device about the second folding axis.

12. The method of claim 11, wherein the folding the electronic device about the second folding axis comprises folding the foldable display device about the second folding axis such that portions of a display surface of the foldable display device face outwardly away from each other towards the outside of the electronic device.

13. The method of claim 9, wherein the moving a plurality of non-folding areas of the foldable display device comprises moving in at least one predetermined increment.

14. The method of claim 9, wherein the moving a plurality of non-folding areas of the foldable display device comprises moving in variable increments.

15. The method of claim 9, further comprising moving the foldable display device to a third position in the folding area overlapping the hinge member such that a third folding axis is defined in the folding area different from the first and second folding axes.

16. The method of claim 9, wherein the folding the electronic device about the first folding axis comprises folding the foldable display device inwardly about the first folding axis such that portions of a display surface of the foldable display device face inwardly towards each other.

17. The electronic device of claim 1, wherein the body part supports the first and the second portions of the supporting member for movement along an internal surface of the housing towards one end of the housing and for movement along the internal surface of the housing towards another end of the housing.

18. The method of claim 9, wherein the moving a plurality of non-folding areas of the foldable display device in the same direction comprises moving the non-foldable areas along an internal surface of the housing towards one of a first end of the housing and a second end of the housing opposite to the first end of the housing.

* * * * *